US008885474B2

(12) United States Patent
Yang et al.

(10) Patent No.: US 8,885,474 B2
(45) Date of Patent: Nov. 11, 2014

(54) METHOD FOR REVERSE LINK CONGESTION OVERLOAD CONTROL IN WIRELESS HIGH SPEED DATA APPLICATIONS

(75) Inventors: Yang Yang, Parsippany, NJ (US); Lily H Zhu, Parsippany, NJ (US); Jialin Zou, Randolph, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1686 days.

(21) Appl. No.: 11/107,010

(22) Filed: Apr. 15, 2005

(65) Prior Publication Data

US 2006/0233110 A1    Oct. 19, 2006

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*H04W 28/12* (2009.01)
*H04W 28/22* (2009.01)

(52) U.S. Cl.
CPC .............. *H04W 28/12* (2013.01); *H04W 28/22* (2013.01)
USPC ............ 370/235; 370/229; 370/230; 370/233

(58) Field of Classification Search
CPC ............................... H04W 28/12; H04W 28/22
USPC ........................ 370/229, 230, 233, 235, 236.2
See application file for complete search history.

(56) References Cited

U.S. PATENT DOCUMENTS

| 7,330,446 | B2* | 2/2008 | Lee et al. ................. 370/318 |
| 2002/0193118 | A1 | 12/2002 | Jain et al. ................. 455/453 |
| 2005/0026624 | A1 | 2/2005 | Gandhi et al. ............. 455/453 |
| 2005/0124369 | A1* | 6/2005 | Attar et al. ................ 455/522 |
| 2007/0117519 | A1* | 5/2007 | Terry et al. ................ 455/69 |
| 2008/0039129 | A1* | 2/2008 | Li et al. .................... 455/522 |

FOREIGN PATENT DOCUMENTS

EP     1 231 807 A2    8/2002    ............... H04Q 7/38

OTHER PUBLICATIONS

3GPP TR 25.896 v2.0.0, "$3^{rd}$ Generation Partnership Project; Technical Specification Group Radio Access Network; Feasibility Study for Enhanced Uplink for UTRA FDD; (Release 6)," Mar. 2004, pp. 14-16, 114-115.*
PCT/US2006/011047, Jul. 19, 2006, PCT Intn't Search Report.

(Continued)

*Primary Examiner* — Jae Y Lee
(74) *Attorney, Agent, or Firm* — Wolff & Samson, PC.

(57) ABSTRACT

The number of Reverse Activity Bits (RABs) equal to "1" per frame is a Congestion Overload (CO) metric used to determine whether the reverse link in a wireless communications system is in a congestion overload state due to a reverse link RF overload. When the value of the CO metric exceeds a first predetermined threshold that is indicative of a congestion overload condition, the system enters a block state where all new connection requests are blocked. Once in the block state, if the value of the CO metric does not decrease but continues to increase and exceeds a second higher threshold, the system enters a mute state. In the mute state a predetermined large percentage of existing active calls are muted. Specifically, a message is sent downlink to specific ATs instructing them to reduce their transmission rates to zero but to still maintain their active connections.

9 Claims, 4 Drawing Sheets

(56) References Cited

OTHER PUBLICATIONS

English language Abstract of Japanese patent application publication JP 4309038 (A), publication date Oct. 30, 1992, available on-line at www.espacenet.com, 1 page.

Japanese Laid-Open patent application publication H04-309038, Oct. 30, 1992, 3 pages.

English language Abstract of Japanese patent application publication JP 2003258718 (A), publication date Sep. 12, 2003, available on-line at www.espacenet.com, 1 page.

Japanese Laid-Open patent application publication JP 2003258718 (A), publication date Sep. 12, 2003, 11 pages.

* cited by examiner

METHOD FOR REVERSE LINK CONGESTION OVERLOAD CONTROL IN WIRELESS HIGH SPEED DATA APPLICATIONS

TECHNICAL FIELD

This invention relates to wireless communications, and more particularly, to controlling congestion on the reverse link in a wireless communications system used for high-speed data applications.

BACKGROUND OF THE INVENTION

Wireless communications systems such as those operating in accordance with CDMA2000 DO standards, for example, are optimized for handling high-speed data applications on the reverse link from the mobile terminals (referred to as Access Terminals [ATs] in CDMA2000 DO terminology) to a base station (referred to as a Base Transceiver Station [BTS] in CDMA2000 DO terminology). Unlike other traffic, such as voice, which is continuous in nature, the high-speed data transmitted by an AT is generally discontinuous and bursty. Due to the bursty nature of data calls, a larger number of data calls can be admitted into the system than could be if all ATs were always transmitting simultaneously. With so many data calls involved in established data connections, there are times when the radio link cannot handle the number of ATs actually simultaneously transmitting on the RL at the rate they desire.

A normal Reverse-link Overload Control (ROC) is used to control radio link loading through adjustment of the transmission rates of the ATs that are transmitting on the reverse link. The ROC is based on a measure at the BTS of a comparison of measured the Rise Over Thermal (ROT) against a threshold, where the ROT is a measure of the total received power on the reverse link over a thermal noise floor, and is an indicator of the total traffic on the reverse link. The ROT is continually measured and compared against the threshold. If the ROT is greater than the threshold, then the BTS sets a Reverse Activity Bit (RAB) to "1" and broadcasts it downlink to all active and connected ATs. A receiving AT then reduces its transmission rate, but not below the minimum rate required by the application that it is running. If the measured ROT is less than the threshold, the RAB is set to "0". A receiving AT then performs a predetermined calculation to determine whether or not and how to increase its transmission rate. Typically, the RAB is transmitted from the BTS to all ATs on the Reverse Activity (RA) channel on the forward link each time slot in a frame, where the number of slots per frame is 16 in the exemplary CDMA2000 DO system and the length of a frame is equal to 26.67 ms. Generally the RAB received by the ATs within a sector will continuously vary between "1" and "0", causing the transmission rates of the connected and active ATs to decrease and increase, while still enabling the ATs to meet their quality requirements (e.g., Frame Error Rate [FER]).

A congestion overload (CO) condition occurs when too many ATs are simultaneously transmitting on the reverse link even after all the receiving ATs have reduced their transmission rate to their minimum allowed values. When such a CO condition occurs, the performance levels of all the ATs decrease so that they are unable to meet their required minimum FER. Meanwhile, during congestion overload, new calls continue to be admitted to the system further exacerbating the situation. After a period of time, with continued poor FER, calls will be automatically dropped. Dropping calls creates its own deleterious side effects as network resources are wasted in reconnecting the dropped calls. Furthermore, reconnection requests sent by the dropped ATs create additional interference on the already congested system.

An effective mechanism for handling a congestion overload condition due to too much traffic on the reverse link is thus required.

SUMMARY OF THE INVENTION

In accordance with an embodiment of the present invention, the value of a congestion overload metric is used as a Congestion Overload Control (COC) on the reverse link to transition the wireless system between a normal state, a block state, and a mute state. The system is shifted from the normal state into the block state when the value of the CO metric reaches a first predetermined threshold that is indicative of a first level of congestion due to too much traffic the reverse link, and is shifted into the mute state when the value of the CO metric increases to a higher second predetermined threshold value that is indicative of an even higher level of congestion on the reverse link. In the block state, new calls by attempting ATs are not admitted into the system. In the mute state, at least some of the active and connected ATs are instructed to decrease their transmit rates to zero, while still maintaining their active connection with the base station. When the value of the CO metric decreases, the system is shifted back to the block state, and eventually back to the normal state when the value of the CO metric reaches another predetermined threshold that is indicative of a normal condition.

In an exemplary embodiment of the invention, a filtered number of RAB equal to "1" per frame is the metric used to determine whether the reverse link in a wireless system is in a congestion overload state due to a reverse link RF overload. In the normal state, the ROC controls the transmission rates of the ATs on the reverse link in accordance with the "1" and "0" values of the changing RABs sent downlink to the active ATs by the BTS. When the value of the CO metric exceeds the first predetermined threshold that is indicative of a congestion overload condition, the system enters the block state where all new connection requests are blocked. Once in the block state, if the value of the CO metric does not decrease but continues to increase and exceeds the second higher threshold, the system enters the mute state. In the mute state a predetermined large percentage of existing active calls are muted. Specifically, a message is sent downlink to specific ATs instructing them to reduce their transmission rates to zero but to still maintain their active connections. If, after a predetermined interval, the value of the CO metric still exceeds the second threshold, an additional number of ATs are instructed to reduce their transmission rates to zero. If the value of the CO metric continues to exceed the second threshold at the end of each successive interval, increasing numbers of ATs are instructed to mute by reducing their transmission rates to zero. If, at the end of an interval, the value of the CO metric has fallen below the second threshold, a predetermined percentage of muted but active calls are un-muted (i.e., instructed to transmit at a non-zero rate). In an exemplary embodiment, an equal small percentage of active calls are gradually un-muted at the end of each interval until all calls have been un-muted. Also, in an exemplary embodiment, in order to impart fairness to the ATs whose active calls have been muted both during the muting process and the un-muting process, a round robin approach is taken so that in successive intervals, different active calls on different ATs are muted. Once all calls have been un-muted and the value of the CO metric falls below the second threshold, the system returns to the block state where only new calls are blocked. When the value of the CO metric falls below a predetermined threshold for exiting the block state, the system returns to the normal state.

The methodology of the present invention can also be applied to other embodiments in which other metrics associated with other network elements can be used to determine overload conditions caused by too high a level of reverse link traffic loading. The value of these other metrics can then be used to trigger the Reverse Link COC and control the transitions between a normal, a block and a mute state. For example, the packet drop rate on a backhaul connection between the RNC and the BTS can be used as a metric for controlling a backhaul overload due to too much reverse link traffic that would similarly affect the quality of communications between the ATs and the BTSs or the BTSs and the Radio Network Controller (RNC), which is connected to the backhaul network. The value of that metric is used as a congestion control to transition the wireless system between the normal, block and mute states in the same manner as described above. Similarly, the acceptance fraction associated with the processing occupancy of the application processor conducting functions of the transmitter and receiver in the BTS can be used as a metric to determine when the processor is overloaded due to too much traffic on the reverse link so as to responsively transition the system between the normal, block, and mute states.

BRIEF DESCRIPTION OF THE DRAWING

The exemplary embodiments of the present invention will become more fully understood from the detailed description given herein below and the accompanying drawings, wherein like elements are represented by like reference numerals, which are given by way of illustration only and thus are not limitative of the exemplary embodiments of the present invention.

DETAILED DESCRIPTION

Figure 1:
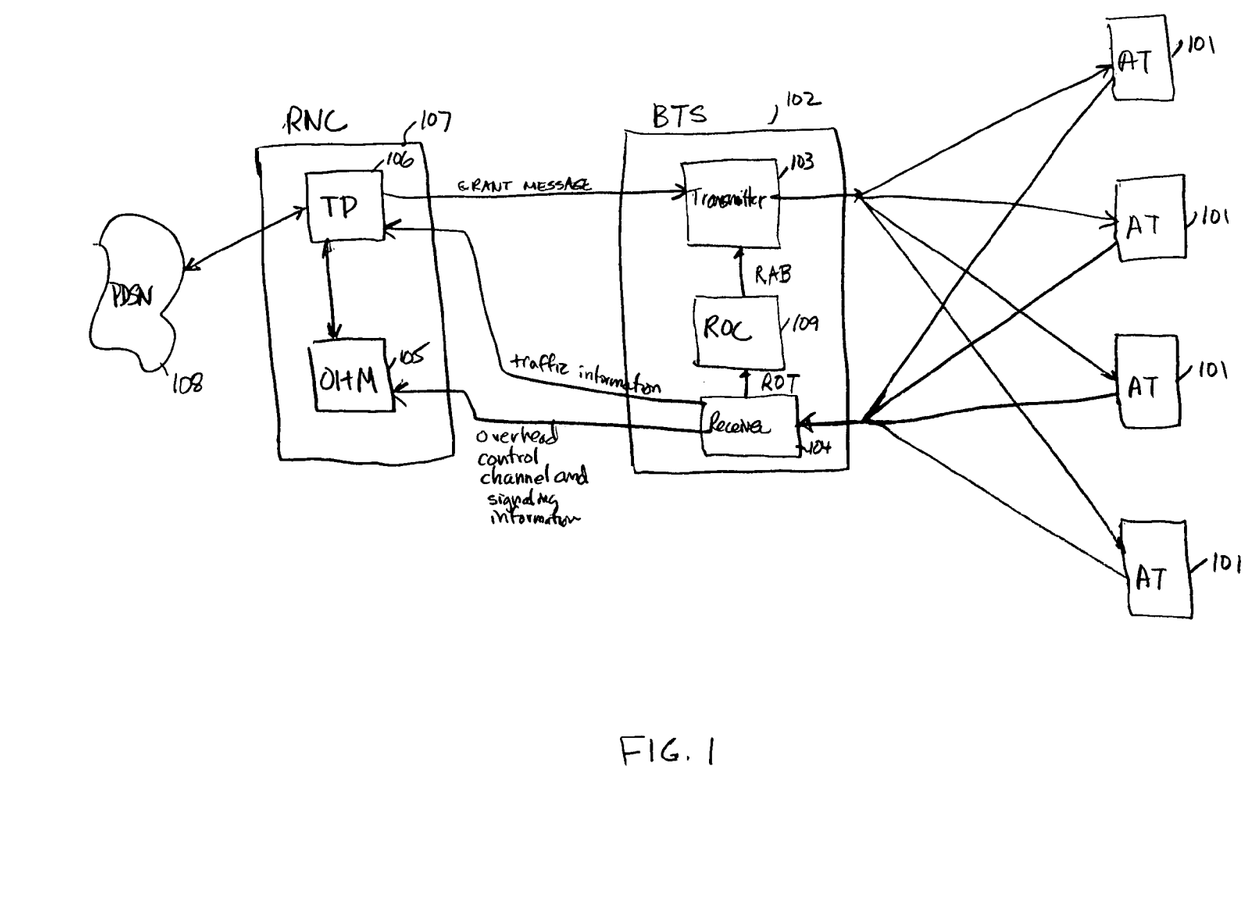
FIG. 1 is a block diagram of a prior art wireless communications system showing an RNC, a BTS and plural ATs in accordance with CDMA2000 DO Rev A standards.

With reference to FIG. 1, in a prior art wireless communications system 100 in accordance with exemplary CDMA2000 DO Rev A standards, a plurality of ATs 101 have wireless connections established with BTS 102. Transmitter 103 within BTS 102 transmits high-speed data downlink (forward link) to ATs 101 while the ATs transmit high-speed data uplink (reverse link) to receiver 104 within BTS 102. Receiver 104 within BTS 102 sends received overhead control channel information and signaling information to Overhead Manager (OHM) 105 and received traffic information to Traffic Processor (TP) 106 within RNC 107. The traffic information (i.e., high speed data) that TP 106 receives from BTS 102 is sent onto the Public Data Switched Network (PDSN) 108 for transmission to its intended destination, and the traffic information that TP 106 receives from the PDSN 108 that is directed to the ATs currently within the coverage area of BTS 102 is sent to transmitter 103 within BTS 102 for downlink transmission. The CDMA2000 DO Rev A standards provide for the TP 106 to generate a Grant Message that is directed to a particular flow running on a specified AT, which is provided to transmitter 103 for purposes of controlling the transmission rates of that specified AT for certain periods of time. In accordance with these standards as they currently exist, if the Grant Message is not resent to an AT, the transmission rate of that AT returns to its original rate.

A conventional Radio-link Overload Controller (ROC) 109 within BTS 102 takes as its input a Rise Over Thermal (ROT) measured at receiver 104 and compares it with a threshold to determine whether the reverse link RF is overloaded. ROC 109 sets a Reverse Activity Bit (RAB) to "1" if the threshold is exceeded and sets the RAB to "0" otherwise. The RAB is continuously broadcast by transmitter 103 to all the ATs 101 on Reverse Activity (RA) channel, once every slot, for each slot in a 16-slot frame where a frame is 26.67 ms long. When an AT 101 receives a RAB of "1", it reduces its current transmission rate. When an AT 101 receives a RAB of "0", it does or does not increase its transmission rate in accordance with a built-in proprietary algorithm that is associated with the receiving AT. When successive RABs equal to "1" are received by an AT 101, it continues to reduce its transmit rate until a minimum rate associated with the application currently running on that AT is reached.

As previously described, in a congestion overload condition when more ATs are simultaneously transmitting on the reverse channel than the channel can accommodate, the ROT measured at the BTS 102 will continuously exceed the threshold, thereby causing the RAB to be repetitively set at "1". Even after each of the ATs 101 has reduced its transmission rate to its minimum rate, the system may still remain in a congestion overload condition causing the RABs being transmitted downlink to continuously, or almost continuously, be "1". When such an overload condition is reached, the prior art system is incapable of reacting to correct the overload condition. Rather, as previously described, what happens is that the performance levels of all the ATs 101 currently in communication with BTS 102 decrease so that they are unable to meet their required FER. Meanwhile, additional ATs not currently in communication with BTS 102 that are attempting to place new calls will continue to be admitted to the system, further exacerbating the situation. After a period of time, with continued poor FER, calls will be automatically dropped. Dropping calls creates its own deleterious side effects as network resources are wasted in reconnecting the dropped ATs. Furthermore, reconnection requests sent by the dropped ATs create additional interference on the already congested system.

In accordance with an exemplary embodiment, the continued generation by the ROC of a RAB equal to "1" is used as a Congestion Overload (CO) metric for triggering a Congestion Overload Control (COC) to transition the wireless system between a normal operating state, a block operating state, and a mute operating state due to reverse link RF overload. Specifically, the number of RAB equal to "1" in a 16-slot frame are counted and are inputted, frame-by-frame, to a long-term digital filter, such as a Finite-Impulse-Response (FIR) filter or an Infinite-Impulse-Response (IIR) filter. The value of the output of that FIR or IIR filter, which is the long-term averaged number of RAB equal to "1" per frame, is the value of the CO metric used to determine whether the system should remain in the normal state or transition to the block state and thence to the mute state, or backwards from the mute state to the block and then back to the normal state.

Figure 2:
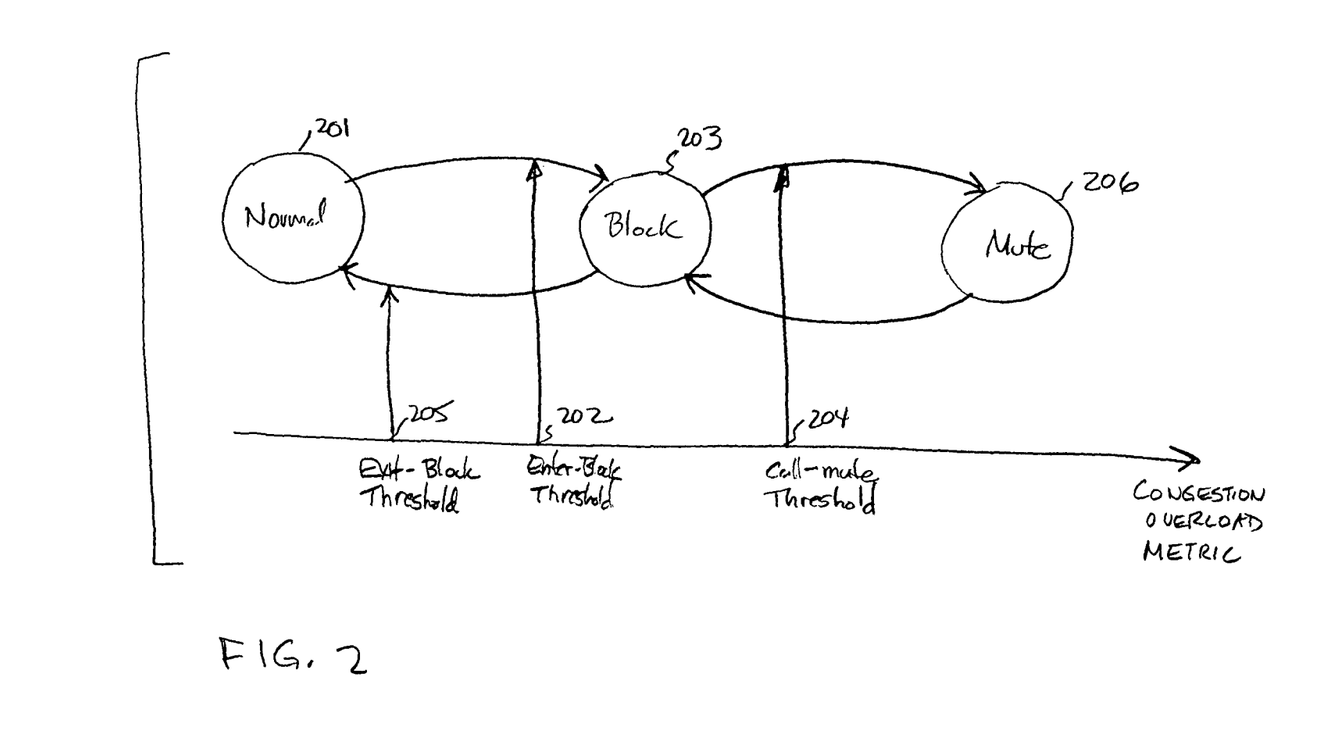
FIG. 2 shows a state diagram showing the transitions of the wireless system between a normal, a block and a mute state, in accordance with a measured congestion overload metric.

FIG. 2 shows the three operating states of a wireless system that are determined in accordance with the value of the CO metric. The normal state is self-explanatory. In this state, the normal operation of the ROC maintains satisfactory control over the reverse link through the transmission of the RAB, which controls the transmission rates of the connected ATs. In the normal state 201, the value of the CO metric, determined from the filtered number of RAB equal to "1" per frame, is below the threshold into which the block state should be entered (the Enter-block threshold 202). When the calculated CO metric exceeds the Enter-block threshold 202, the BTS informs the Overhead Manager (OHM) in the RNC which sector of the BTS's coverage area is congestion overloaded and the system enters the block state 203. While in the block state, the OHM rejects new call requests to the overloaded sector. Also, while in the block state 203, the value of the CO metric is compared with a second higher threshold (Enter-mute threshold 204) that triggers entering the mute state 206. Also, while in the block state 203, the value of the CO metric is compared with an Exit-block threshold 205. When the value of the CO metric falls below Exit-block threshold 205, the system returns to the normal state and blocking of new call requests in the previously blocked sector is discontinued. As noted in FIG. 2, Exit-block threshold 205 is lower than Enter-block threshold 202.

When the value of the CO metric exceeds Enter-mute threshold 204, the system enters the mute state 206. In the mute state 206, the BTS determines which ATs are to be muted, i.e., are instructed to reduce their transmission rates to zero while still maintaining an active connection with the BTS. The BTS informs the Traffic Process (TP) in the RNC which ATs are to be muted and the TP sends Grant messages to the BTS and thence to the selected ATs that indicate to the selected ATs that they should reduce their transmission rates to zero. While in the mute state, new calls continue to be blocked. In an exemplary embodiment, when the mute state is initially entered, ½ of the currently connected ATs are selected to be muted. If, after a predetermined interval of time after the ½ of currently connected ATs have been muted, the value of the CO metric still exceeds Enter-mute threshold, ½ of the remaining ATs are muted so that a total of ¾ of the original ATs are muted. If, after the next predetermined time interval the calculated CO metric still exceeds the Enter-mute threshold 204, then ½ of the remaining active ATs are muted, thereby leaving only ⅛ of the original ATs still actively transmitting. If, at the end of the next predetermined time interval the calculated CO metric still exceeds the Enter-mute threshold 204, then all the remaining active ATs are muted.

When the value of the CO metric is less than the Enter-mute threshold 204 at the end of a predetermined time interval after the initial ½ of the ATs have been muted, or at the end of a predetermined time interval after any additional ATs have been muted, the number of active but muted calls will begin to be gradually reduced. This gradual reduction in muted calls continues at the end of each subsequent time interval as long as the value of the CO metric remains below the Enter-mute threshold 204. In the exemplary embodiment, at the end of each interval in which the value of the CO metric remains below the Enter-mute threshold 204, a fixed percentage of the total active but muted calls are un-muted. Specifically, in the exemplary embodiment, $1/16$ of the original total active calls are un-muted at the end of each subsequent time interval. In order to provide fairness to all the active calls in the overloaded sector, the ATs that are muted are addressed in a round-robin circular manner so that different ATs are muted in sequential time intervals.

Figure 3:
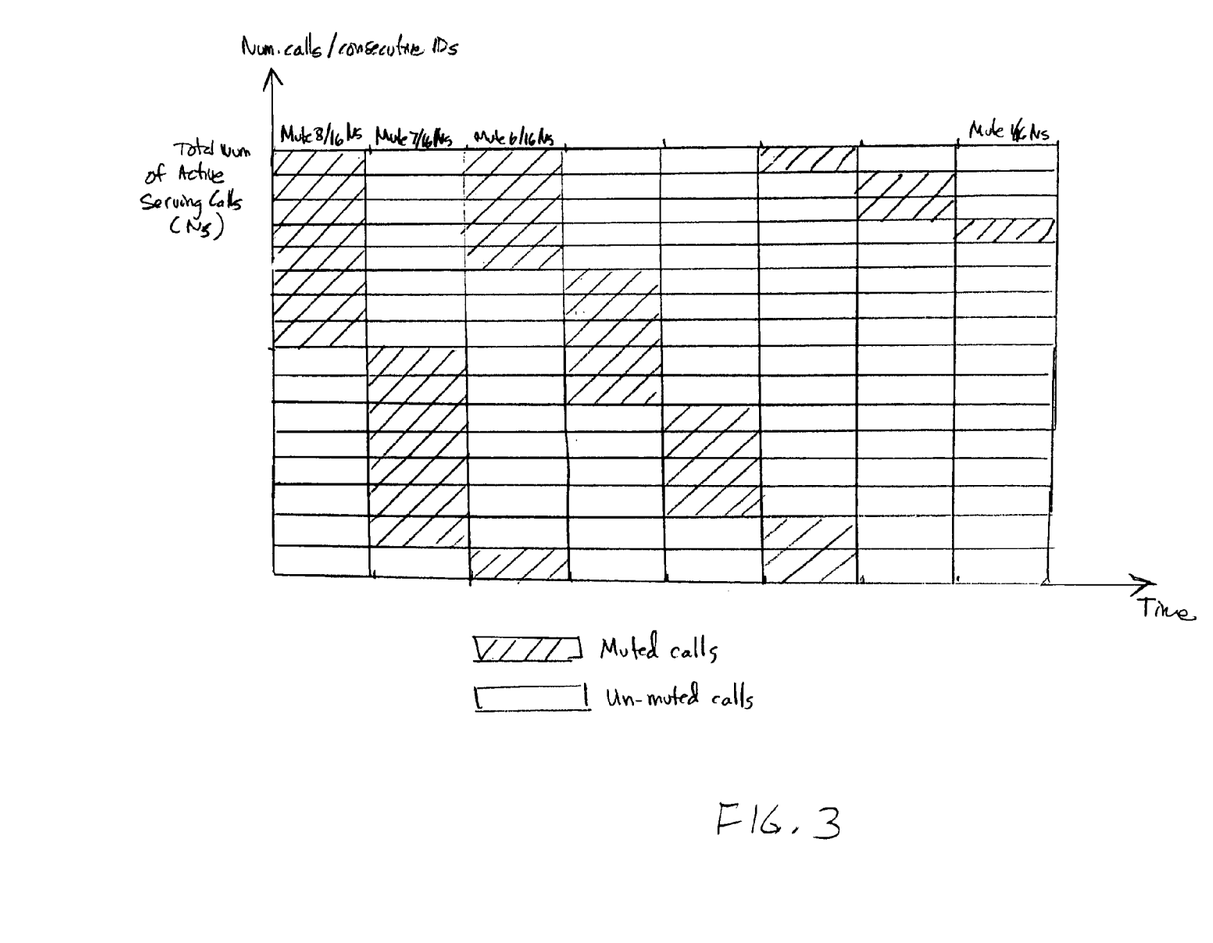
FIG. 3 is a diagram showing circular addressing of ATs for call un-muting as the number of muted calls is gradually reduced.

FIG. 3 shows the gradual reduction over time in the number of calls being muted as well as the circular addressing of the calls being muted. Thus, as shown in FIG. 3, in the first interval of duration L, $8/16$ of the total number of active service calls, Ns, are muted. In the next interval of duration L, that number is reduced by $1/16$, so that only $7/16$ of Ns active calls are muted. During this second interval, a different set of calls are muted than were muted in the first interval. In the third interval, only $6/16$ of Ns active service calls are muted, the calls being muted being different than the calls that were muted during the second interval. This continues, as shown, until the end of the eighth interval, when all active calls are un-muted.

A similar round-robin circular addressing of calls can also be used when the measured CO metric continues to remain above the Enter-mute threshold 204 at the end of each interval and the number of ATs to be muted continues to be increased. Since the number of ATs that are muted keeps increasing by 50% of the remaining un-muted ATs at each interval, however, the ability to impart "fairness" to all the active ATs cannot be as effectively demonstrated as can the circular addressing in the downward direction that is illustrated in FIG. 3.

Once all the muted calls have been un-muted, and the value of the CO metric remains below the Enter-mute threshold, the system continues in the block state 203 until the value of the CO falls below the Exit-block threshold 205 and the system returns to the normal state.

Figure 4:
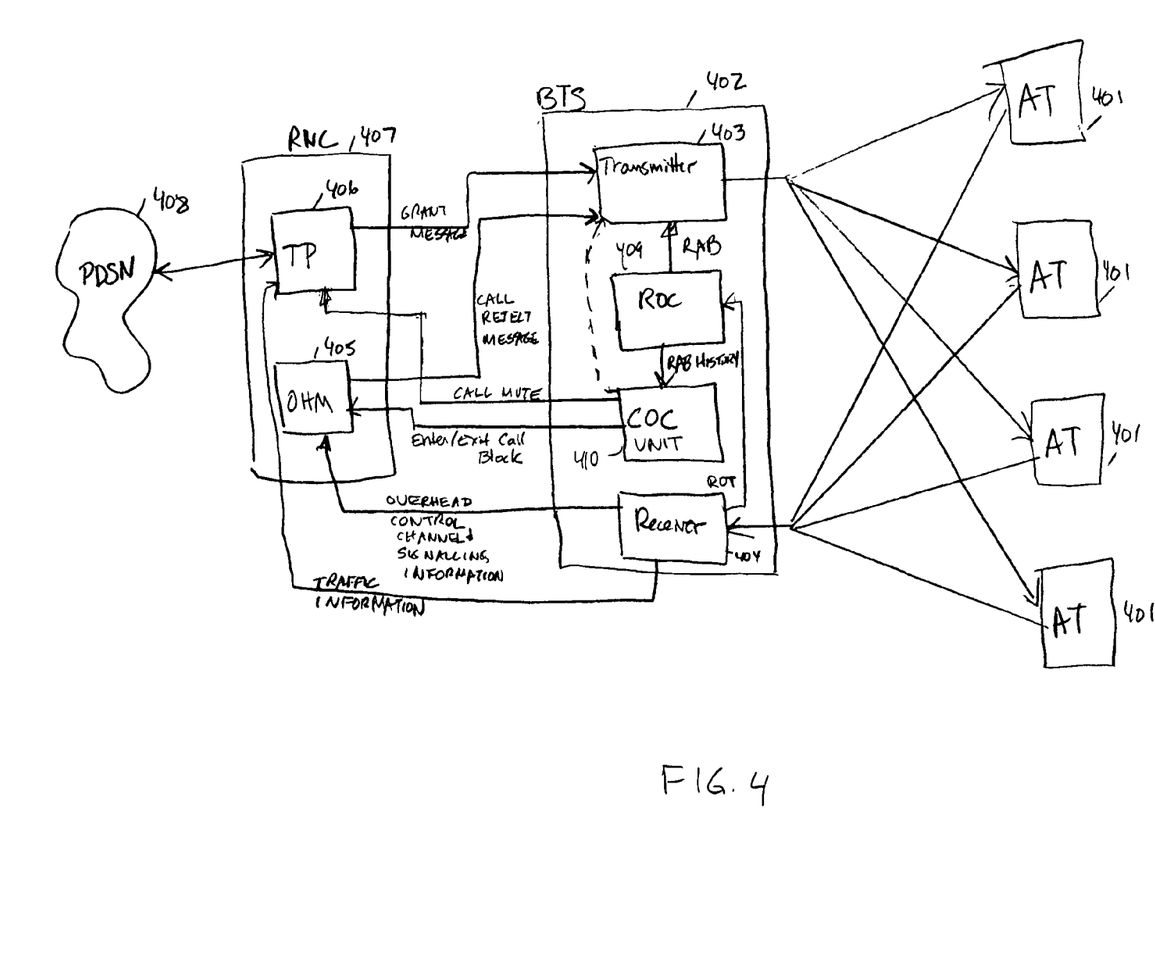
FIG. 4 is a block diagram of the wireless communications system of FIG. 1 as modified in accordance with an embodiment of the present invention.

FIG. 4 shows a wireless communications system 400 in accordance with CDMA2000 DO Rev A standards that has been adapted as an embodiment of the present invention. As in FIG. 1, a plurality of ATs 401 have wireless connections established with BTS 402. Transmitter 403 within BTS 402 transmits high-speed data downlink to ATs 401, while the ATs 401 transmit high-speed data uplink to receiver 404 within BTS 402. Receiver 404 sends received overhead control channel information and signaling information to OHM 405 and traffic information to TP 406 within RNC 407. TP 406 sends and receives traffic information (i.e., high-speed date) onto and off the PDSN 408. ROC 409 takes as its input a ROT measured by receiver 404 and compares it with a threshold to determine whether the reverse link RF is overloaded. ROC 409 sets a RAB to "1" if the threshold is exceeded and sets the RAB to "0" otherwise. The RAB is inputted to transmitter 403 and broadcast to all the ATs 401 on the Reverse Activity (RA) channel once every slot for each slot in a 16-slot frame. A RAB history is also outputted by ROC 409 to a COC unit 410, the RAB history being the number of RAB equal to "1" per each frame. COC unit 410 filters the sequence of RAB histories it receives from ROC 409 to calculate the CO metric to be compared with Enter-block threshold 202, Enter-mute threshold 204, and Exit-block threshold 205, as previously discussed. When the calculated CO metric is greater than the Enter-block threshold 202, COC unit 410 sends a call block message to OHM 405. OHM 405 in turn sends a call reject message to transmitter 403 telling the BTS 402 to reject accepting new calls in the overloaded sector. When the calculated CO metric is greater than the Enter-mute threshold 204, a call mute message is sent by COC unit 410 to TP 406, indicating to which specific ATs a Grant message is to be sent that directs those ATs to set their transmission rates to zero. While in the mute state, OHM 405 continues to send a call reject message to transmitter 403, preventing the admission of any new calls. At the end of each predetermined interval while in the mute state, if the current value of the calculated CO metric remains above Enter-mute threshold 204, COC unit 410 provides TP with the identity of a larger number of ATs to which a Grant message is to be sent to reduce their transmission rates to zero. If the current value of the calculated CO metric is below Enter-mute threshold 204, however, COC unit 410 provides TP with the identify 1/16 fewer number of ATs to which a Grant message is to be sent to reduce their transmission rates to zero. As previously described, this number continues to decrease and the identity of the IDs to which a Grant message is to be sent are selected by COC unit 410 in a round-robin fashion from interval to interval until all ATs have been un-muted. As previously described, when the CO metric calculated by COC unit 410 falls below Exit-block threshold 205, COC unit 410 discontinues the call block message being sent to OHM 405. The latter then discontinues sending a call reject message to transmitter 403, thereby allowing new calls to be admitted. The system has now returned to the normal mode.

The system above has been described in conformance with the exemplary CDMA2000 DO Rev A standards. The previous revision of the CDMA2000 DO standards, Rev 0, did not support transmission of a Grant message. Accordingly, in an embodiment supporting Rev 0 standards, COC unit 410 will produce a rate limit message, which is inputted to transmitter 403 for transmission to all active ATs 401. The rate limit message broadcast to all ATs 401 will indicate within the message the identifies of the specific ATs which are to set their transmission rates to zero during each interval of the mute state.

Although the number of RAB being "1" per frame has been described as being used to derive the measured CO metric for determining reverse link RF overload, other parameters could be used to derive the CO metric. For example, the ROT calculated by the receiver could be directly used to derive the CO metric. In this situation, the amount of time that the value of ROT is greater than a threshold could be used to drive the system between the normal, the block and the mute states.

Too much traffic on the reverse link can cause other areas of overload in the system. An overload metric associated with these other areas can be measured and used to trigger the Reverse Link COC and control transitions between a normal, a block and a mute state so as to reduce the reverse link traffic in a controlled manner and avoid the deleterious effects of that traffic overload. For example, the packet drop rate on a backhaul connection between the RNC and the BTS can be used as a metric for controlling a backhaul overload due to too much reverse link traffic that would similarly affect the quality of communications between the ATs and the BTSs or the BTSs and the Radio Network Controller (RNC), which is connected to the backhaul network. The value of that metric is used as a congestion control to transition the wireless system between the normal, block and mute states in the same manner as described above. Similarly, the acceptance fraction associated with the processing occupancy of the application processor conducting functions of the transmitter and receiver in the BTS can be used as a metric to determine when the processor is overloaded due to too much traffic on the reverse link so as to responsively transition the system between the normal, block, and mute states.

Although described in conjunction with a CDMA system that is operating in accordance with CDMA2000 DO Rev A, and as explained, Rev 0 standards, the present invention can be applied in any CDMA system, such as a UMTS system, that has data applications where an overload of too much traffic on the reverse link can occur and where conventional methods of controlling overload are unable to solve the inherent problem.

The foregoing therefore merely illustrates the principles of the invention. It will thus be appreciated that those skilled in the art will be able to devise various arrangements, which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams herein represent conceptual views illustrating the principles of the invention. The functions of the various elements shown in the figures may be provided through the use of dedicated hardware as well as hardware capable of executing software in association with appropriate software.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicants thus regard any means which can provide those functionalities as equivalent as those shown herein.

The invention claimed is:

1. A congestion management method in a wireless communications system in which a plurality of mobile terminals transmit data on a reverse link, the method comprising the steps of:

selecting one of a plurality of overload control states based on a congestion overload metric, the plurality of overload control states having a hierarchical relationship with respect to each other;

when the congestion overload metric has at least a first predetermined value that is indicative of the presence of an overload condition in the system that is being caused by a level of data traffic on the reverse link that is greater than what the reverse link can support, rejecting a connection request from another mobile terminal; and when the congestion overload metric has at least a second predetermined value that is greater than the first predetermined value, which second predetermined value is also indicative of the presence of an overload condition in the system, sending at least one message to a selected percentage of the mobile terminals instructing the selected percentage of mobile terminals to reduce their data transmission rate to zero for one or more predetermined time intervals, an active connection being maintained with the mobile terminals.

2. The method of claim 1 wherein the at least one message to mute is sent to a subset of the plurality of mobile terminals.

3. The method of claim 2 further comprising the step of: if, after a predetermined interval of time after the subset of the plurality of mobile terminals have been instructed to mute, the congestion overload metric still has at least the second predetermined value, then sending at least one message instructing an additional subset of the remaining un-muted plurality of mobile terminals to mute.

4. The method of claim 3 further comprising the step of: if, after a predetermined interval of time after the additional subset of the remaining mobile terminals have been instructed to mute, the congestion overload metric still has at least the second predetermined value, then sending at least one message instructing the remaining un-muted plurality of mobile terminals to mute.

5. The method of claim 4 further comprising the step of: if, after a predetermined interval of time after the subset or any additional mobile terminals of the plurality of mobile terminals have been muted, the congestion overload metric has a value less than the second predetermined value, then gradually reducing the number of mobile terminals being muted.

6. The method of claim 5 wherein the step of gradually reducing the number of mobile terminals being muted instructs specific mobile terminals to un-mute and mute in a circular round-robin manner until all mobile terminals have been un-muted.

7. The method of claim 1 wherein the overload condition is a reverse link radio link congestion and the congestion overload metric is derived from measurements of a Rise Over Thermal (ROT).

8. The method of claim 7 where the congestion overload metric is derived from Reverse Activity Bits (RABs) that are set to "1" or "0" in accordance with whether the measured ROT is greater or less than a predetermined threshold.

9. The method of claim 8 wherein the congestion overload metric is derived from the total number of RABs in a frame that represents a measured ROT greater than the predetermined threshold.

* * * * *